United States Patent [19]
Morita et al.

[11] Patent Number: 5,383,069
[45] Date of Patent: Jan. 17, 1995

[54] DATA REPRODUCING DEVICE WITH DROP OUT DETECTION OF POSITION INFORMATION AND MEANS FOR COMPENSATING WITH TAPE SPEED DETECTING

[75] Inventors: Shinya Morita; Fumiyoshi Abe, both of Kanagawa, Japan

[73] Assignee: Sony Corporation, Tokyo, Japan

[21] Appl. No.: 826,395

[22] Filed: Jan. 27, 1992

[30] Foreign Application Priority Data

Jan. 31, 1991 [JP] Japan .................. 3-032078

[51] Int. Cl.⁶ .............................. G11B 15/52
[52] U.S. Cl. .................. 360/73.11; 360/73.12; 360/38.1
[58] Field of Search .......... 360/33.1, 37.1, 38.1, 360/70, 69, 73.11, 72.1, 72.2, 73.12

[56] References Cited

U.S. PATENT DOCUMENTS 3,984,868 10/1976 Ragle et al. .............. 360/73.11
4,151,566 4/1979 Ohrman .............. 360/37.1 X
4,620,241 10/1986 Ono .............. 360/73.14
5,050,002 9/1991 Suzuki et al. .............. 360/38.1 X

*Primary Examiner*—Aristotelis Psitos
*Assistant Examiner*—Duncan Wilkinson
*Attorney, Agent, or Firm*—William S. Frommer; Alvin Sinderbrand

[57] ABSTRACT

A data reproducing device for reproducing a positional information track formed in the longitudinal direction of a magnetic tape according to the present invention is capable of easily correcting regenerative positional information on the basis of count information even when the regenerative information is not obtained from the positional information tack by obtaining the count information consisting of the number so updating operations of positional information in accordance with a first clock generated based on the regenerative positional information acquired from the positional information track formed in the longitudinal direction of the magnetic tape and with a second clock generated based on rotation frequencies of tape reels for driving the magnetic tape.

4 Claims, 3 Drawing Sheets

DATA REPRODUCING DEVICE WITH DROP OUT DETECTION OF POSITION INFORMATION AND MEANS FOR COMPENSATING WITH TAPE SPEED DETECTING

BACKGROUND OF THE INVENTION

The present invention relates to a data reproducing device suitable for a data recorder based on a format such as the ID-1 format.

In a conventional video tape recorder (VTR) for recording and reproducing video signals by helically scanning a magnetic tape with a rotary head, there are a plurality of recording tracks in the longitudinal direction of the magnetic tape in addition to video tracks consisting of helical recording tracks. Voice signals, control signals and time codes are recorded on these longitudinal tracks and also reproduced therefrom.

In such a VTR, control signals, pulse signals or the like corresponding to video tracks positions are recorded. These control signals are regenerated, and scan timings or the like of the rotary head and a traveling system of the magnetic tape are servo-controlled.

Absolute time information of the video tracks is recorded as a time code. The position of a desired video track is recorded to permit accurate editing and seeking of the regenerative top.

If the time codes are not correctly regenerated due to drop-out or the like, time codes are corrected corresponding to the timings of the simultaneous control signals. This prevents errors in the editing or the seeking of regenerative top.

In the proposed ID-1 format, (Third Draft PROPOSED AMERICAN NATIONAL STANDARD 19 mm TYPE ID-1 INSTRUMENTATION DIGITAL CASSETTE FORMAT X3B6/88-12 Project 592-D 1988-03-22) desired information data is recorded and reproduced from the magnetic tape by utilizing the SMPTE D-1 digital VTR format.

In the ID-1 format, as illustrated in FIG. 1(A), the desired information data are recorded on and reproduced from the helical recording tracks serving as data tracks TR on a magnetic tape TP. Formed at the lower ends of the data tracks TR are a control signal track CTL and a time code track TC in the longitudinal direction of the magnetic tape TP.

The time code track TC is available for the user. Recorded on the control signal track CTL is, as illustrated in FIG. 1(B), synchronous data segments SYNC consisting of 4 bits and indicating a section T1-T2 of four helical data tracks TR0, TR1, TR2 and TR3 with located between second bits and third bits thereof. 28-bit identification data segments are recorded between the synchronous data SYNC.

In the 28-bit identification data, track set identification data TSID numbered from the top according to the four data tracks TR0, TR1, TR2, TR3 are recorded in 23 bits following the synchronous data SYNC; a home track identification data HTID representing recording head information or the like are recorded in the subsequent 4 bits; and a 1-bit even-numbered parity PR is appended thereto.

Hence, in the ID-1 format data recorder, as in the control signals of a VTR, scan timings of the rotary head and the traveling system of the magnetic tape TP can be servo-controlled by reproducing the synchronous data SYNC recorded on the control signal track CTL. Identification data TSID, HTID, PR recorded on the control signal track CTL are reproduced, thereby detecting positions of data tracks TR0, TR1, TR2, TR3 in the same manner as with time codes in a VTR. It is therefore possible to accurately execute editing and seeking of the regenerative top.

In the data recorder based on the above-described ID-1 format, however, the same functions as those of the control signal and the time code in VTR are actualized only by the recording information on the control signal track CTL. Hence, if the drop-out or the like takes place, there is a possibility that the identification data TSID, HTID, PR cannot be reproduced.

If the identification data TSID, HTID, PR on the control signal track CTL cannot be correctly reproduced, there is an increased possibility that the synchronous data SYNC on the control signal track CTL cannot be also correctly reproduced. For this reason, the correction cannot be effected by use of timings of the synchronous data SYNC as in the case of a VTR where identification data TSID, HTID, PR cannot be reproduced.

To obviate such a problem, there can be recorded on the data tracks TR0, TR1, TR2, TR3 of the magnetic tape TP, the same time codes as the vertical interval time codes (VITC) of a VTR which are recorded on the video tracks while being overlapped with a vertical synchronous period of the video signal.

With this arrangement, even when the identification data TSID, HTID, PR on the control signal track CTL cannot be correctly reproduced, the correction can be made at the timings based on the time codes recorded on the data tracks TR0, TR1, TR2, TR3.

If the same time codes as those of VITC are recorded on and reproduced from the data tracks TR0, TR1, TR2, TR3, however, a circuit for recording and reproducing the time codes is required and reproducing the time codes is required in the processing circuit for recording and reproducing the information data. A problem arises in that the circuitry inevitably becomes complicated and correspondingly large in size.

SUMMARY OF THE INVENTION

In view of the foregoing, it is an object of this invention to provide a data reproducing device which is able to easily make a correction even when regenerative positional information is not obtained from positional information tracks formed in the longitudinal direction of a magnetic tape.

The foregoing object and other objects of the invention have been achieved by the provision of a data reproducing device for reproducing a positional information track CTL, formed in the longitudinal direction of a magnetic tape on which positional information TSID is recorded, the device comprising regenerative positional information correcting means in which a first clock IDC0 is generated on the basis of the regenerative positional information IDR obtained by reproducing positional information track CTL of the magnetic tape, as well as a second clock IDC1 is generated on the basis of rotation frequencies of first and second tape reels for driving the magnetic tape, and the count information IDC2 consisting of the numbers of updating operations of the positional information IDR outputted in accordance with the first and second clocks IDC0, IDC1, thereby a signal for regenerative positional information IDR is obtained by use of count information IDC2 even when the regenerative positional information IDR is not obtained.

The count information IDC2 obtained consists of the number of updating operations of the positional information IDR in accordance with the first clock IDC0 generated based on the regenerative positional information IDR acquired from the positional information track CTL formed in the longitudinal direction of the magnetic tape and with the second clock IDC1 generated based on the rotation frequencies FGS, FGT of the tape reels for driving the magnetic tape.

The nature, principle and utility of the invention will become more apparent from the following detailed description when read in conjunction with the accompanying drawings in which like parts are designated by reference numerals or characters.

DETAILED DESCRIPTION OF THE INVENTION

Figure 2:
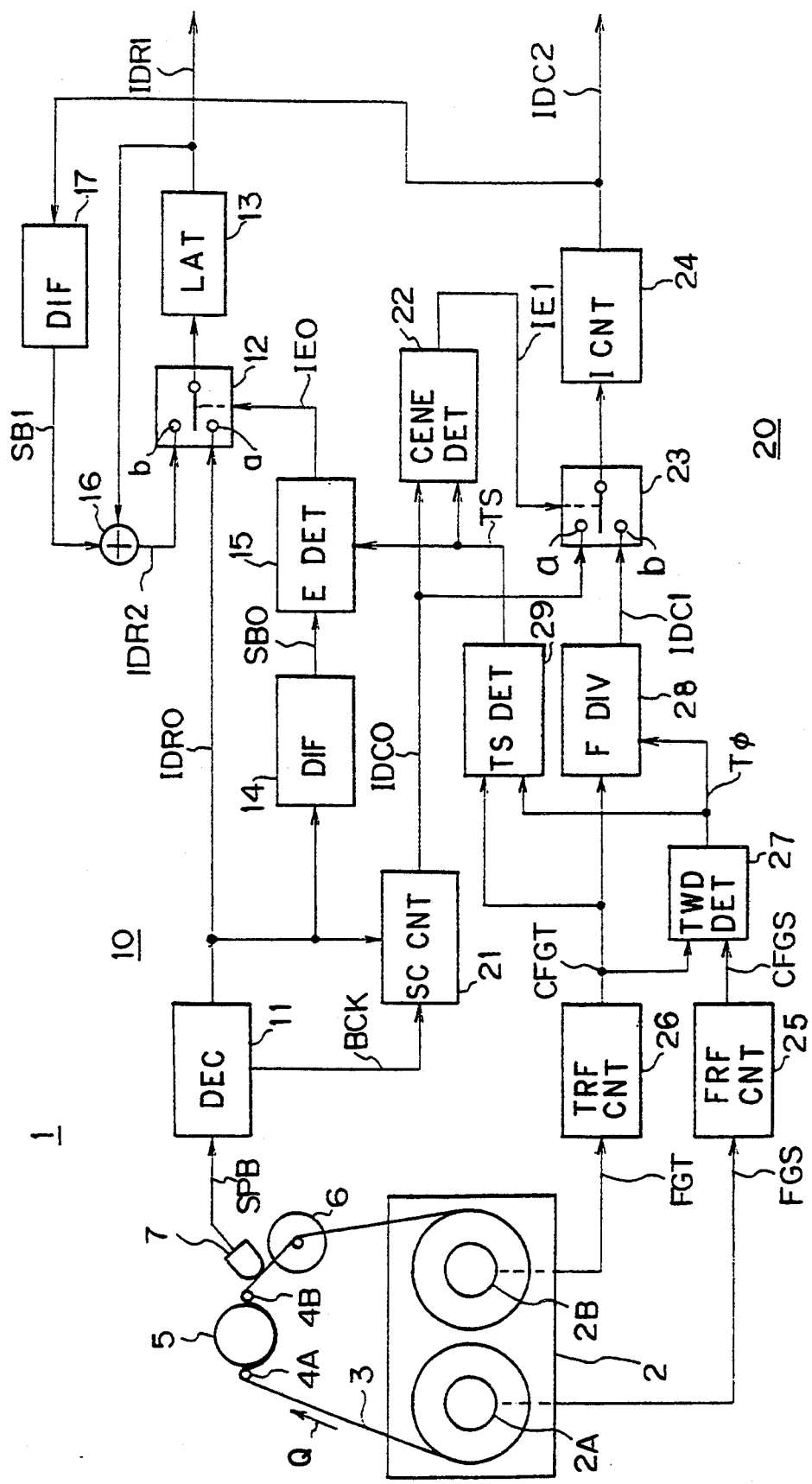
FIG. 2 is a block diagram illustrating a data recorder in one embodiment of this invention.

Preferred embodiments of this invention will be described with reference to the accompanying drawings:

Referring to FIG. 2, a data recorder 1 based on the ID-1 format is depicted. A magnetic tape 3 led from a feed reel 2A of a tape cassette 2 is, as indicated by an arrowhead Q, wound through a predetermined angle on drum 5 mounted with a rotary head via inclined guides 4A, 4B. The magnetic tape 3 is thereafter wound on a take-up reel 2B of the tape cassette 2 via a capstan 6.

Figure 1A:
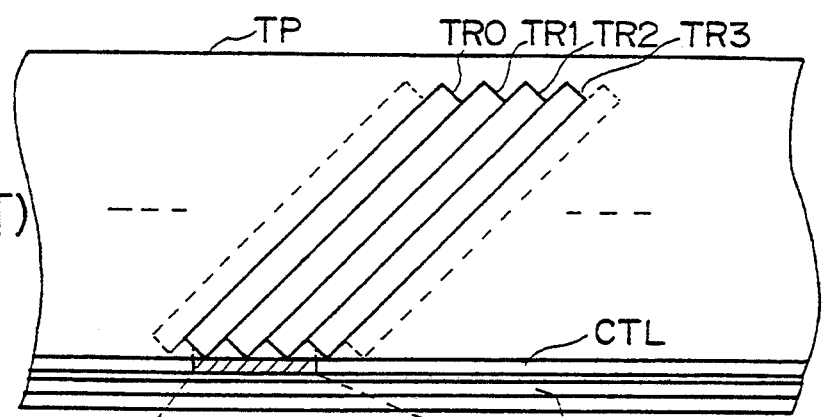
FIGS. 1(A) and 1(B) are schematic diagrams illustrating a geometry on a CTL track based on the ID-1 format.
Figure 1B:
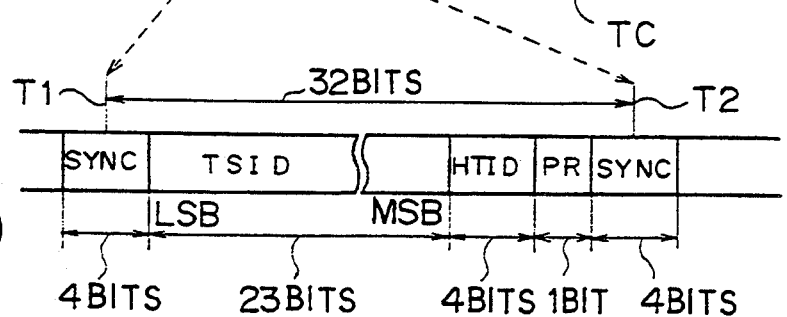

A fixed type of CTL head 7 is disposed between the inclined guide 4B and the capstan 6 to contact a control signal track CTL (FIG. 1(A)) of the magnetic tape 3. Contents of the control signal track CTL of the magnetic tape 3 are thus read out. Regenerative signals SPB are read and inputted to a decoder 11 of an identification regenerative output system 10.

The decoder 11 decodes the regenerative signals SPB and reproduces identification data TSID, HTID, PR partitioned by synchronous data SYNC and the timings of the synchronous data SYNC. The signals are inputted as first identification reproduced data IDRO to a latch circuit 13 via a first input terminal a and an output terminal of a first selection circuit 12 and then transmitted as second identification reproduced data IDR1 at predetermined intervals.

The first identification reproduced data IDRO outputted from the decoder 11 are also transmitted to a difference circuit 14 and a synchronous clock counter 21 of the identification counter output system 20 in addition to being transmitted to the first selection circuit 12. The decoder 11 then generates a bit clock BCK consisting of a 16-bit synchronous signal composed of an interval of the synchronous data SYNC and sends this bit clock to the synchronous clock counter 21.

The decoder 11 executes an error detecting process by use of an even-numbered parity bit PR. When detecting a read error of the regenerative signal SPB due to a drop-out or the like, the identification data TSID, HTID decoded just before PR are not updated but transmitted directly as the first identification reproduced data IDRO. Even if no error is detected by the even-numbered parity PR, there exists a possibility that the deteriorated identification data YSID is to be transmitted.

Therefore, a difference between the current first identification reproduced data IDRO inputted and the immediately preceding IDRO is calculated by the difference circuit 14 and transmitted as difference data SBO to the error detection circuit 15.

Figure 3:
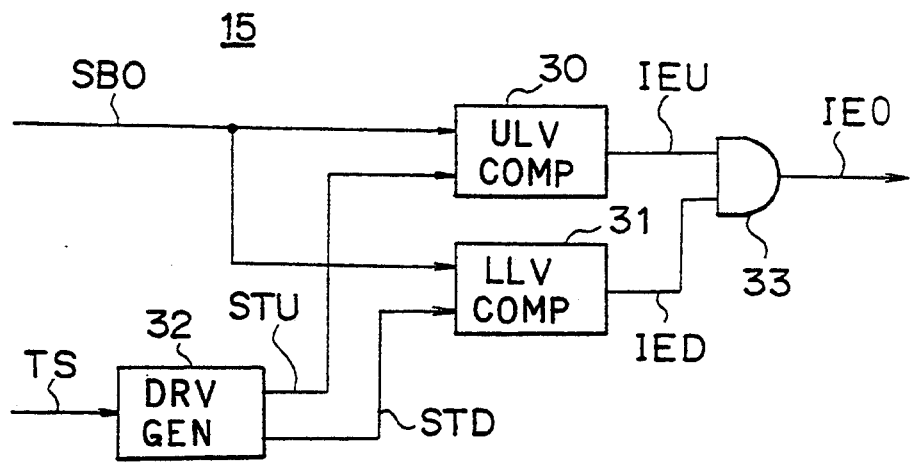
FIG. 3 is a block diagram depicting a construction of an error detection circuit of the data recorder.

The error detection circuit 15 is depicted in FIG. 3. The difference data SBO is inputted both to an upper limit value comparing circuit 30 and to a lower limit value comparing circuit 31. The difference data is then compared with a difference upper limit value STU and a difference lower limit value STD which are each produced by a difference reference value generation circuit 32. The comparative results IEU, IED are inputted to an AND circuit 33.

Figure 4:
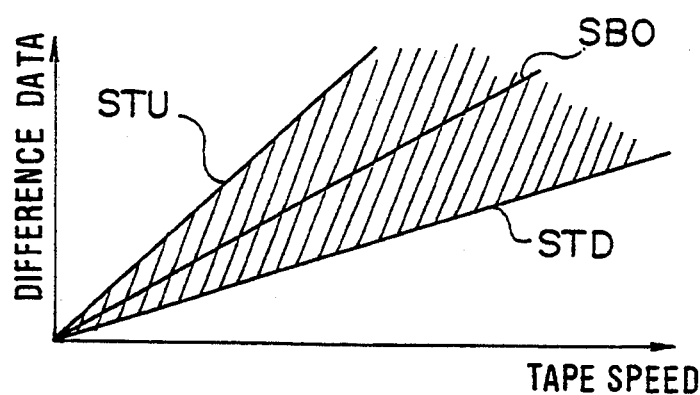
FIG. 4 is a characteristic curve diagram of the error detection circuit.

The difference reference value generation circuit 32 generates the difference upper and lower limit values STU, STD shown in FIG. 4 in accordance with a tape speed TS inputted from the identification counter output system 20.

When the difference data SBO is larger than the difference upper limit value STU, the upper limit value comparing circuit 30 sends the comparative result IEU rising at a logic "H" level. When the difference data SBO is smaller than the difference lower limit STD, the lower limit value comparing circuit 31 sends the comparative result IED rising at the logic "H" level.

Error detection signal IEO is transmitted correspondingly from the error detection circuit 15 to the first selection circuit 12. IEO assumes a logic "L" level indicating no error, when the difference data SBO is between the difference upper and lower limit values, STU and STD shown by FIG. 4. IEO assumes the logic "H" level indicating the existence of an error, when IEC deviates from the range shown by FIG. 4.

In the first selection circuit 12, when the error detection signal IEO from the error detection circuit 15 assumes the logic "L" level, the first input terminal a is selected. As a result, the first identification reproduced data IDRO is transmitted via the latch circuit 13.

When the error detection signal IEO inputted from the error detection circuit 15 assumes the logic "H" level, the second input terminal b is selected.

The first identification reproduced data IDRO, after being latched by the latch circuit 13, is inputted to an adder circuit 16. The identification reproduced data IDRO is then added to difference data SB1, consisting of the difference between the values of identification counter data IDC2, which is outputted from the identification counter output system 20 and then calculated by a difference circuit 17. Third identification reproduced data IDR2 is obtained as a result of this and is transmitted via the latch circuit 13.

In the identification counter output system 20, a counter 21 counts bit clocks BCK at every interval of the synchronous data SYNC generating clocks IDCO which is sent to a CTL existence/non-existence detection circuit 22. Simultaneously, the identification clocks IDCO are transmitted to an ID counter 24 via the first input terminal a and an output terminal of a second selection circuit 23.

The identification counter 24 is updated at every rise of the identification clocks IDCO and outputs identification count data IDC2.

Note that if the timings of the synchronous data SYNC are regenerated normally by the decoder 11 of the identification regenerative output system 10, the identification count data IDC2, transmitted from the identification counter 24 is completely synchronized with the second identification reproduced data IDR1. Whereas if the timings of the synchronous data SYNC are not regenerated normally, there is a possibility that the identification counter 24 will not be updated.

Hence, in the identification counter output system 20, the CTL existence/non-existence detection circuit 22 detects whether or not a frequency of the identification clock IDCO exhibits a deviation within a range of 10 to 40% within the tape speed frequency TS. When obtaining the result therein, an error detection signal IE1 for selecting the first input terminal a is transmitted to the second selection circuit 23.

If a negative result comes out, i.e., when the frequency of the identification clock IDCO exhibits a deviation of 10 to 40% or greater with respect to the tape speed frequency TS, error detection signal IE1 for selecting a second input terminal b is transmitted to the second selection circuit 23 on the assumption that the timings of the synchronous data SYNC are not normally regenerated (viz., there is no control signal recording track).

A feed reel frequency signal FGS and a take-up reel frequency signal FGT, obtained from a frequency generators provided in the feed reel 2A and the take-up reel 2B, are inputted respectively to a feed reel frequency counter 25 and a take-up reel frequency counter 26.

The feed reel frequency counter 25 counts feed reel frequency signals FGS, thereby generating feed reel frequency signals CFGS. The signals CFGS are transmitted to a tape winding-diameter detection circuit 27.

The take-up reel frequency counter 26 counts take-up frequency signals FGT, thereby generating take-up reel frequency signals CFGT which are transmitted to a tape winding-diameter detection circuit 27, a frequency dividing circuit 28 and a tape speed detection circuit 29.

The tape winding-diameter detection circuit 27 detects a tape winding-diameter T$\phi$ of the take-up reel 2B in accordance with the feed reel frequency signals CFGS and the take-up reel frequency signals CFGT. This tape winding-diameter is sent to the frequency dividing circuit 28 and to the tape speed detection circuit 29.

The frequency dividing circuit 28 frequency-divides the take-up reel frequency signal CFGT in accordance with the tape winding-diameter T$\phi$, generating the second identification clock IDC1 corresponding to the timing of the synchronous data SYNC on the magnetic tape 3. The second identification clock IDC1 is inputted to the identification counter 24 via the second input terminal b of the second selection circuit 23.

The tape speed detection circuit 29 detects the tape speed TS in accordance with the tape winding-diameter T$\phi$ and the take-up reel frequency signal CFGT. This tape speed TS is sent to the CTL existence/non-existence detection circuit 22 and the error detection circuit 15 of the identification regenerative output system 10.

Even if the timings of the synchronous data SYNC are not regenerated normally (i.e., there is no control signal recording track), the identification counter 24 is updated at the timings of the second identification clocks IDC1 in accordance with the timings of the synchronous data SYNC on the magnetic tape 3 and outputs the identification count data IDC2.

Therefore, the identification count data IDC2 are constantly outputted. Even if the decoder 11 detects a read error of the regenerative signal SPB due to the drop-out or the like, causing transmission of a deteriorated identification data TSID, it is still possible to obtain third identification reproduced data IDR2 which is compensated for condition because variations in the identification count data IDC2 have been added to the second identification reproduced data IDR1 to produce IDR2.

In accordance with the present invention, the identification counter 24 is updated with the first identification clocks IDCO generated based on the first identification reproduced data IDRO during the normal reproduction of the control signal track CTL. If CTL is not reproduced normally, the identification counter 24 is updated with the second identification clocks IDC1 generated based on the rotations of the reels 2A, 2B for driving the magnetic tape 3. It is, therefore, possible to obtain the identification counter output IDC2 which is always reproduced normally. It is thus possible to attain the data recorder capable of readily making the correction corresponding to the variations in the identification counter output IDC2 even if the first identification reproduced data IDRO cannot be obtained because the control signal track CTL cannot be reproduced normally.

Note that the embodiment discussed above has dealt with a case where the present invention is applied to the data recorder of ID-1 format. The present invention is not, however, limited to this data recorder but is also suitable for other applications such as reproducing the same longitudinal track on which the information similar to the time codes and the control signals in VTR is recorded.

As discussed above, according to the present invention, it is possible to attain the data reproducing device capable of easily correcting the regenerative positional information on the basis of the count information even when the regenerative positional information is not obtained from the positional information track.

While there has been described the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A data reproducing device for reproducing a position information track formed in the longitudinal direction of a magnetic tape driven from one of first and second tape reels to the other and for producing position information of said magnetic tape, comprising;

magnetic head means for obtaining a regeneration signal from said position information track in sliding contact thereto;

detecting means for outputting regeneration position information decoded from said position information in response to said regeneration signal;

first clock generating means for generating a first clock signal as a function of said regeneration position information;.

second clock generating means for generating a second clock signal as a function of tape reel rotation frequency signals derived from one of said tape reels;

first error state detecting means for detecting that the output of said first clock generating means is either in a normal state wherein a frequency of said first clock signal is within a predetermined range determined by said rotation frequency signals or is in an error state wherein said frequency of said first clock signal is not within said predetermined range;

clock signal selecting means for selectively outputting said first clock signal when said normal state is detected and for outputting said second clock signal when said error state is detected;

count data generating means for generating count data corresponding to said output of said clock signal selecting means;

second error state detecting means for detecting a normal state or an error state in said regeneration position information outputted by said detecting means;

input selecting means having a first input supplied with said regeneration position information and having a second input, said input selecting means being operable for selecting said first input or said second input as a function of the state detected by said second error state detecting means so as to select said first input if the normal state is detected and to select said second input if the error state is detected;

first difference detecting means for detecting a difference between present count data obtained from said count data generating means and prior count data previously obtained from said count data generating means; and an adding means for adding the output of said first difference detecting means to the output of said input selecting means and supplying a sum resulting from said addition to said second input of said input selecting means;

wherein position information corrected for a defect in said regeneration signal is obtained from the output of said input selecting means when the error state in said regeneration position information is detected.

2. The data reproducing device according to claim 1, further comprising:

a speed detecting means for detecting a running speed of said magnetic tape as a function of rotation frequency signals derived from said first and second tape reels;

and wherein said first error state detecting means and said second error state detecting means each include means for adaptively changing reference values for detection by said first error state detecting means and by said second error state detecting means, respectively, as a function of the running speed detected by said speed detecting means.

3. The data reproducing device according to claim 2, wherein said first error state detecting means detects a period of said first clock signal, and compares said period with said reference values to detect said normal state or said error state.

4. The data reproducing device according to claim 2, wherein said reference values for detection by said second error state detecting means include an upper limit value and a lower limit value; and wherein said second error state detecting means further includes:

second difference detecting means for detecting a difference between present regeneration position information obtained from said detecting means and prior regeneration position information previously obtained from said detecting means; and a comparison means for comparing an output value of said second difference detecting means with said upper limit value and said lower limit value.

* * * * *